United States Patent
Manzanero Fernandez et al.

(10) Patent No.: US 12,084,638 B2
(45) Date of Patent: Sep. 10, 2024

(54) METHOD FOR DEVATTING THE GRAPE HARVEST AND MEANS FOR DEVATTING A GRAPE HARVEST

(71) Applicant: PRODUCTOS AGROVIN, S.A., Alcazar de San Juan (ES)

(72) Inventors: Irene Manzanero Fernandez, Alcazar de San Juan (ES); Juan Alberto Iniesta Ortiz, Alcazar de San Juan (ES); Ricardo Jurado Fuentes, Alcazar de San Juan (ES)

(73) Assignee: PRODUCTOS AGROVIN, S.A., Alcazar de San Juan (ES)

( * ) Notice: Subject to any disclaimer, the term of this patent is extended or adjusted under 35 U.S.C. 154(b) by 651 days.

(21) Appl. No.: 16/970,825

(22) PCT Filed: May 16, 2019

(86) PCT No.: PCT/ES2019/070320
§ 371 (c)(1),
(2) Date: Aug. 18, 2020

(87) PCT Pub. No.: WO2019/207196
PCT Pub. Date: Oct. 31, 2019

(65) Prior Publication Data
US 2021/0115363 A1 Apr. 22, 2021

(30) Foreign Application Priority Data

May 18, 2018 (ES) .................................. ES201830475

(51) Int. Cl.
*C12G 1/00* (2019.01)
*B01F 33/40* (2022.01)
(Continued)

(52) U.S. Cl.
CPC ............ *C12G 1/005* (2013.01); *B01F 33/406* (2022.01); *C12G 1/02* (2013.01); *B01F 2101/16* (2022.01)

(58) Field of Classification Search
CPC .. A47J 31/00; A47J 43/00; A47J 43/04; A47J 47/01; A47G 23/00; A47G 23/0241;
(Continued)

(56) References Cited

U.S. PATENT DOCUMENTS

| | | | |
|---|---|---|---|
| 3,910,173 A | 10/1975 | Zepponi | |
| 4,595,296 A * | 6/1986 | Parks | B01F 33/406 366/106 |

(Continued)

FOREIGN PATENT DOCUMENTS

| | | |
|---|---|---|
| FR | 2994436 A1 | 2/2014 |
| WO | 9845403 A1 | 10/1998 |

OTHER PUBLICATIONS

Phil, Wine Press Residue, Mar and Pomace, accessed at http://winepressblogger.com/1339/wine_press_residue_marc_and_pomace/index.html, 2010.*

(Continued)

*Primary Examiner* — Phuong T Nguyen
(74) *Attorney, Agent, or Firm* — LUCAS & MERCANTI, LLP

(57) ABSTRACT

A method for devatting the grape harvest and a device for devatting a grape harvest via the pressurized injection of air or other gases in a controlled manner into self-emptying wine making vats or similar, for the purpose of emptying the grape harvest once the maceration thereof has been completed, after the homogenization of the mixture, transferring the liquid portion to another tank and the crushed grape pulp (Continued)

to the press, thereby obtaining a solid phase (pomace) as a waste product which can be used to produce associated products.

13 Claims, 6 Drawing Sheets

(51) Int. Cl.
*C12G 1/02* (2006.01)
*B01F 101/16* (2022.01)

(58) Field of Classification Search
CPC .......... C12G 1/005; C12G 1/02; B01F 33/406; B01F 2101/16
USPC ........ 99/323.1, 277.1, 277.2, 277, 275, 276; 426/484, 489, 473, 519
See application file for complete search history.

(56) References Cited

U.S. PATENT DOCUMENTS

| | | | |
|---|---|---|---|
| 6,387,424 B2* | 5/2002 | Funk | B67D 1/0043 426/231 |
| 6,703,055 B1 | 3/2004 | Klein | |
| 2004/0052655 A1* | 3/2004 | Fisher | F04F 1/00 417/313 |

OTHER PUBLICATIONS

International Search Report for Corresponding International Application No. PCT/ES2019/070320 (2 Pages) (Aug. 22, 2019).

* cited by examiner

METHOD FOR DEVATTING THE GRAPE HARVEST AND MEANS FOR DEVATTING A GRAPE HARVEST

CROSS REFERENCE TO RELATED APPLICATION

This Application is a 371 of PCT/ES2019/070320 filed on May 16, 2019 which, in turn, claimed the priority of Spanish Patent Application No. P201830475 filed on May 18, 2018, both applications are incorporated herein by reference.

OBJECT OF THE INVENTION

The present invention relates to a method for devatting the grape harvest and a means for devatting a grape harvest via the pressurised injection of air or other gases in a controlled manner into self-emptying wine making vats or similar, for the purpose of emptying the grape harvest once the maceration thereof has been completed.

Particularly, the invention relates to the transfer of the liquid portion to another tank and the crushed grape pulp to the press using, to that end, a method and a means for devatting based on the pressurised injection of air or other gases in a controlled manner into self-emptying wine making vats for the purpose of homogenising the mixture before devatting, facilitating said operation.

DESCRIPTION OF THE STATE OF THE ART

Maceration is understood to be the extraction process involving two phases: a solid phase and a liquid phase. The solid product has a series of extractant liquid-soluble compounds that are to be extracted. In red wine production, the grape peel or skin (solid product) contains polyphenolic and aromatic compounds (that are to be extracted to provide the end product with greater colour intensity and more aromas). During maceration, these compounds are solubilised in the liquid (first the must and then the wine).

Once the maceration process has ended and the density value which the winemaker considers suitable has been achieved, the self-emptying wine making tank is emptied, an operation referred to as devatting. To that end, the common existing method consists of first extracting the liquid portion, an operation generally referred to as bleeding the grape harvest, and then the entire dry solid portion is extracted.

To that end, the tank is provided therein and in the lower portion thereof with grids acting like a sieve; such that they allow the passage of the liquid through one of their openings in which there has been placed on the outer portion thereof a conduit which will lead the liquid to a portable cellar pump which will drive said liquid to a second tank where it will be stored.

Once the liquid has been extracted, the dry solid phase or pulp is removed. To that end, a door located in the lower portion of the tank, having a larger section provided with a cutter and being referred to as pulp opening, is opened. The pulp therefore falls, due to the effect of gravity, into an open pipe provided with a worm screw, or in its absence, towards a devatting box. These elements enable the pulp to be carried to the press where it is subjected to stronger draining action.

Usually not all the pulp is cleared from the tank simply through the mentioned effect of gravity, so intervention by an operator who, upon entering the tank, must push/drag this pulp to the pulp opening to completely discharge same, is required. This is a task that is shunned by winemakers.

With the common method that has been described, the devatting of the grape harvest from a 100,000-litre tank takes about 4 hours.

A variant of said conventional method is described in patent application FR 2596768 A1, according to which the must is bled through a filter located in the centre of the tank which communicates with a must discharge conduit through perforations. Once the must has been bled, rotating blades at the bottom of the tank transport the solid portion to a discharge opening. The geometry of the blades does not cover the whole bottom of the tank, so not all the pulp will be cleared by the action of said blades, intervention by an operator who, upon entering the tank, must push/drag this pulp to the pulp opening to completely discharge same, again being required.

To overcome said problem to a certain extent, self-emptying tanks incorporating stirrers for homogenising liquid and solid phases of the grape harvest before devatting are often used. Said stirrers are bulky equipment which reduce the capacity of the tanks, require complex maintenance, and are expensive. The use of stirrers facilitates dragging the solid or the mixture thereof with the liquid phase to the outlet, but operator intervention is still needed because the homogenisation achieved is not complete, with there being remaining pulp residues which, again, must be removed by pushing/dragging said pulp residues to the pulp opening to completely discharge same.

The aforementioned problems are solved by a method and equipment according to the invention for devatting the grape harvest via the pressurised injection of air or other gases in a controlled manner into self-emptying wine making vats or similar, for the purpose of emptying the grape harvest once the maceration thereof has been completed, wherein the mixture is perfectly homogenised before devatting via the pressurised injection of air.

DESCRIPTION OF THE INVENTION

The present invention provides a method for devatting the grape harvest and a means for devatting a grape harvest via the pressurised injection of air or other gases in a controlled manner into self-emptying wine making vats or similar, for the purpose of emptying the grape harvest once the maceration thereof has been completed, wherein the mixture is perfectly homogenised before devatting via the pressurised injection of air.

Another object of the present invention is to overcome the problems existing in the prior art.

Other additional objects and advantages of the present invention are derived from the following description, taking into consideration the figures that are included and the preferred exemplary embodiments that are described in an illustrative but non-limiting manner.

The injections can be injections of pressurised air or of any other gas that is functionally equivalent and can be used as an alternative. Particularly, said injections can be injections of nitrogen or other inert gases.

The method for devatting the grape harvest and the means for devatting a grape harvest via the pressurised injection of air is based on the injection of air into the lower portion of the frustoconical-shaped bottom of the tank. Once the maceration process has ended and the density value which the winemaker considers suitable has been achieved, the self-emptying wine making tank is emptied. To that end, for the purpose of homogenising the content of the tank, pressurised air is injected continuously for 10-20 minutes, depending on the volume of pulps generated in the tank according to the grape variety and its degree of ripeness.

After said time, the liquid and solid phases of the grape harvest are perfectly homogenised, such that the grape harvest can be removed through one of the conventional openings of the tank, generally the lower opening, performing the extraction thereof through pumping, using portable or fixed devatting pumps. During devatting and to continue facilitating the homogenisation of the mixture, the injections of air are maintained until the end of devatting. Said injections of air will have a duration between 1 and 15 seconds and will be performed at intervals comprised between 2 and 15 minutes.

The pumping will drive the grape harvest to a sieve or a conveyor where the grape harvest is drained, sending the liquid portion to a storage area and the drained solid portion to a pressing area, where a liquid portion, which is again sent to a storage area, generally with the liquid portion previously obtained in the devatting, and a solid portion (pomace), which can be used to produce related products, are recovered. As a variant, the pumping will drive the grape harvest to a press with a bleeding grid, where the grape harvest is drained, sending the liquid portion to a storage area and obtaining the solid portion (pomace) intended for the production of related products in the same press.

Generally, the injection of air through the lower portion of the frustoconical-shaped bottom of the vat is performed through at least one compressed air diffuser or injector installed in the lower portion of said tank.

Advantageously, the actuation time of the devatting system can be controlled by means of a microprocessor of the PC type, PLC type, or similar, in which the time values are fixed or can be varied by the user of the pumping-over system.

Likewise, another additional feature of the method and equipment according to the invention is the inclusion of a system for cleaning the inside of the at least one diffuser which, once the vat is emptied, is filled therein with liquid and/or crushed grape pulp which can degrade rapidly under certain conditions, causing putrefaction and unwanted substances. To that end, the method is complemented with an injection of water into the at least one diffuser, water which entrains the waste products of wine making from the inside of the at least one diffuser, cleaning said inside. Compressed air which dries the at least one diffuser by eliminating the remaining water is again injected later. In a preferred embodiment, said injection of water is performed through the compressed air distribution circuit of the equipment and, in an even more preferred embodiment, a water intake is arranged in the compressed air pipe.

Advantageously, the actuation of the devatting system is carried out with a pressure of the pressurised air system comprised between 3 and 12 bar for the purpose of ensuring the effective operation of the on-off valve which allows the passage of air, preferably between 6 and 8 bar. The devatting system can work with air at the pressure obtained directly in the pressurised air system or by means of a pressure regulator.

The compressed air used in the devatting system must be free of impurities such as moisture, oils and suspended particles, such that (food grade) purified air can be used directly, or the method according to the invention can include an air purification step.

When gas supplied by a compressor is used, the equipment will include filters at the outlet of said compressor to eliminate moisture, oils and suspended particles from the compressed air.

Both the method and the equipment according to the invention can be controlled through a microprocessor of the PC type, PLC type, or similar, which performs all the operations in an automated manner based on values that are previously fixed or selected by the user.

The devatting system according to the invention can be an independent system as has been described or can be integrated as another step of a method for the pressurised injection of air or other gases in a controlled manner into wine making vats or similar, for the purpose of extracting polyphenolic and aromatic compounds via the process of pumping over the grape harvest during the maceration thereof. In said case, the equipment will include, together with the pumping-over diffusers, the at least one devatting diffuser which will be installed in the same compressed air distribution circuit and can be controlled through a shared microprocessor.

DESCRIPTION OF THE FIGURES

To complete the description that is being made and to help make the invention fully understandable, said description is accompanied by a set of figures wherein the following is depicted with an illustrative and non-limiting character.

PREFERRED EMBODIMENTS

To complete the description that is being made and for the purpose of helping to better understand its features, several specific exemplary embodiments of systems for the pressurised injection of air or other gases in a controlled manner into wine making vats according to the invention are provided in the present specification. These examples are provided for illustration purposes and do not seek to limit the present invention. Furthermore, the present invention covers all the possible combinations of particular and preferred embodiments herein indicated.

Figure 1:
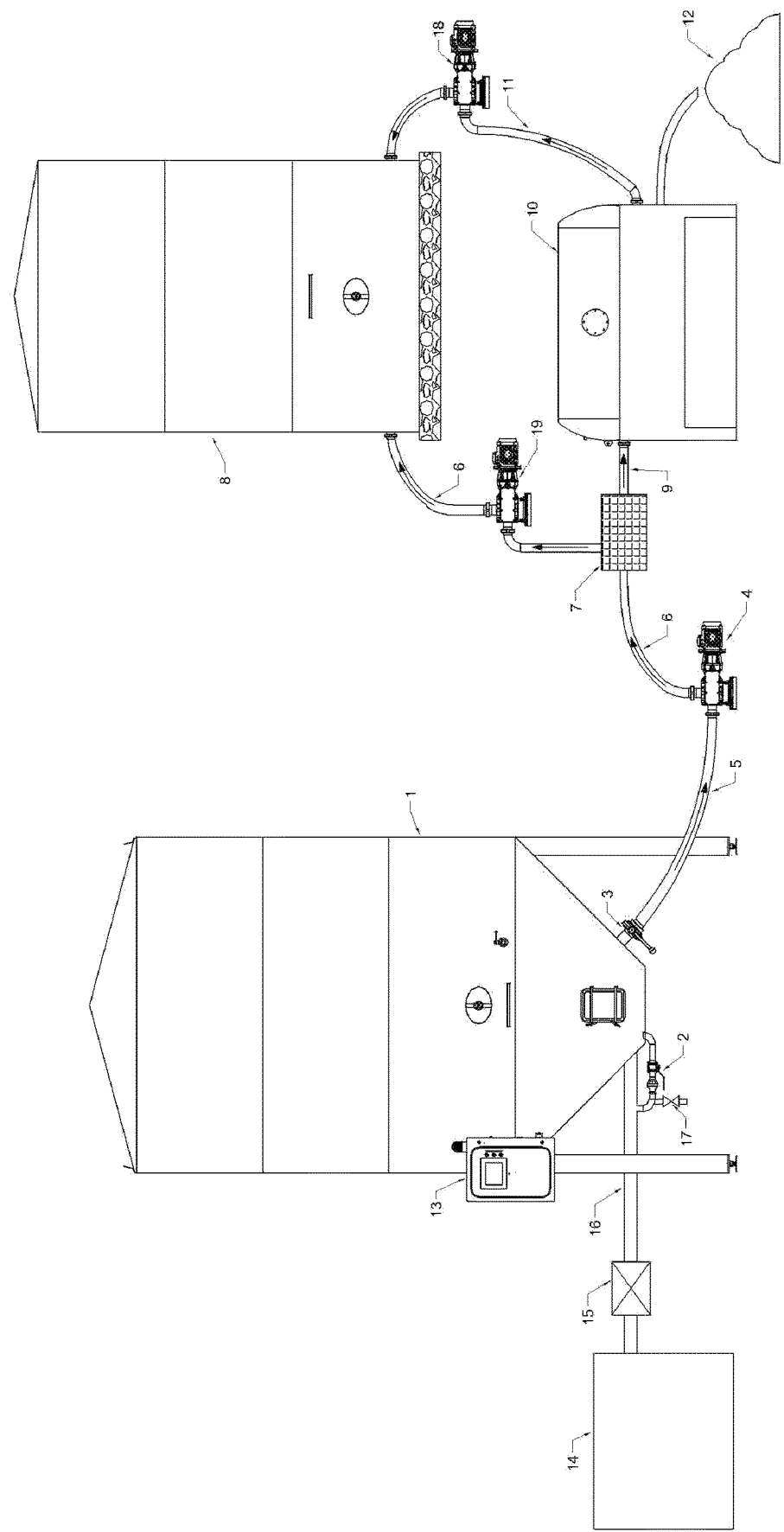
FIG. 1 shows a general diagram of a means for devatting a grape harvest via the pressurised injection of air according to the invention, incorporating a bleeding sieve.

FIG. 1 shows an elevational view of the general diagram of equipment for devatting the grape harvest via the pressurised injection of air or other gases in a controlled manner into self-emptying wine making tanks or similar. The grape harvest with the differentiated liquid and solid phases is arranged inside the wine making tank (1). To start the devatting method, the at least one diffuser (2) injects air into the tank for 10-20 minutes. After said time, the grape harvest is perfectly homogenised, such that the grape harvest can be removed through the opening of the tank (3), being extracted from the tank by means of the devatting pump (4) through the closed suction pipe (5), while the pressurised injection of air is maintained throughout the entire devatting process. The same pump (4) drives the grape harvest through the closed drive pipe (6) in which there is intercalated a sieve (7), where the grape harvest is drained, the resulting liquid portion being pumped through the closed drive pipe (6) by means of the pump (19) to a tank (8) for storing the wine that is produced, whereas the drained solid portion runs along the pulp pipe (9) to the press (10), where a new liquid portion, which is sent by the pump (18) through the drive pipe (11) to the tank (8) for storing the wine that is produced, is recovered, and the solid portion (12), which can be used to produce related products, is separated.

Figure 1B:
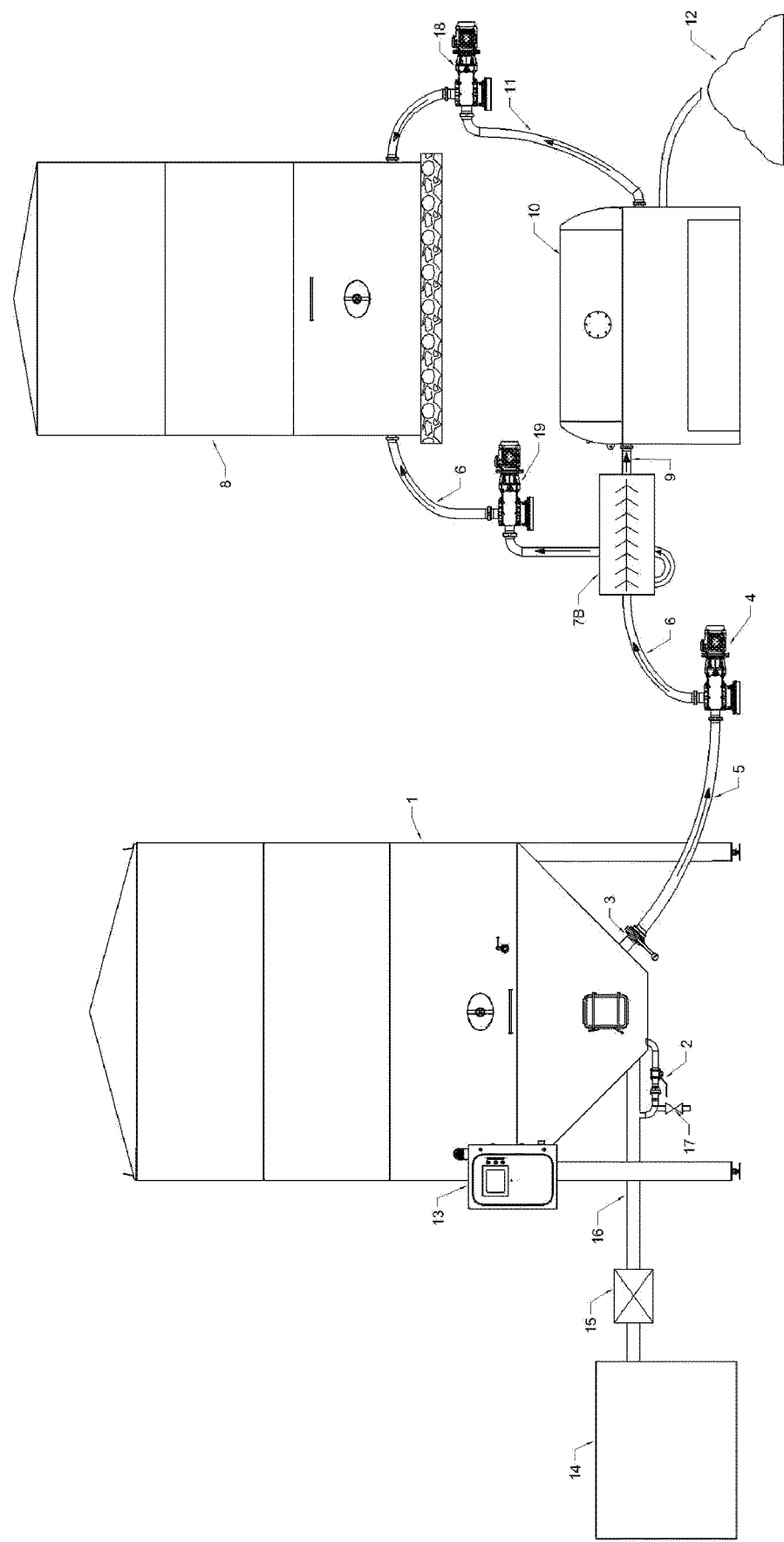
FIG. 1B shows a general diagram of a means for devatting a grape harvest via the pressurised injection of air according to the invention, incorporating a screw conveyor with a bleeding grid.

FIG. 1B shows a variant of the invention in which a pump (4) drives the grape harvest through the closed drive pipe (6) in which there is intercalated a conveyor (7B), preferably a screw conveyor, where the grape harvest is drained, the resulting liquid portion being pumped through the closed drive pipe (6) by means of the pump (19) to a tank (8) for storing the wine that is produced, whereas the drained solid portion runs along the pulp pipe (9) to the press (10).

Figure 1C:
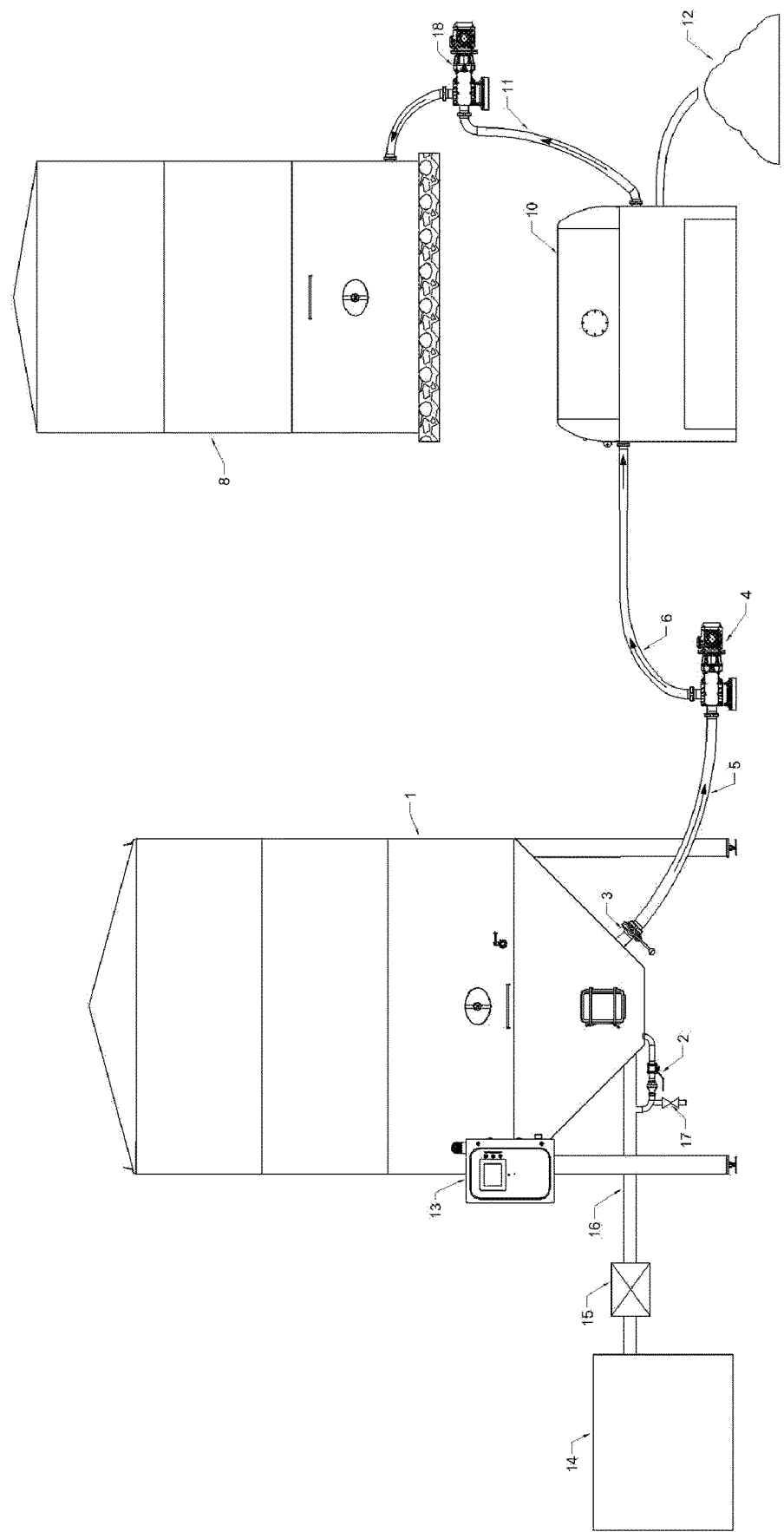
FIG. 1C shows a general diagram of a means for devatting a grape harvest via the pressurised injection of air according to the invention, incorporating a press with a bleeding grid.

FIG. 1C shows another variant of the invention incorporating a pump (4) which drives the grape harvest through the closed drive pipe (6) to a press with a bleeding grid (10) where the grape harvest is drained, said grape harvest then being transferred to the tank (8) for storing the wine that is produced, and the solid portion (12) is separated.

Advantageously, the actuation time of the devatting system can be controlled by means of a microprocessor of the PC type, PLC type, or similar (13), in which the time values of pressurised injection of air during devatting are fixed or can be varied by the user of the devatting system.

The air is supplied by the compressor (14) incorporating filters (15) in the outlet of said compressor to eliminate moisture, oils and suspended particles from the compressed air and the compressed air distribution circuit (16) includes a water intake (17) for cleaning the at least one diffuser (2) once the devatting of the grape harvest processed in the tank (1) has been completed.

Advantageously, the actuation of the devatting system is carried out with a pressure of the pressurised air system comprised between 3 and 12 bar for the purpose of ensuring the effective operation of the on-off valve which allows the passage of air, preferably between 6 and 8 bar. The devatting system can work with air at the pressure obtained directly in the pressurised air system or by means of a pressure regulator.

Both the method and the equipment according to the invention can be controlled through a shared microprocessor (13) or an independent microprocessor (not depicted) of the PC type, PLC type, or similar, which performs all the operations in an automated manner based on values that are previously fixed or selected by the user.

Figure 2:
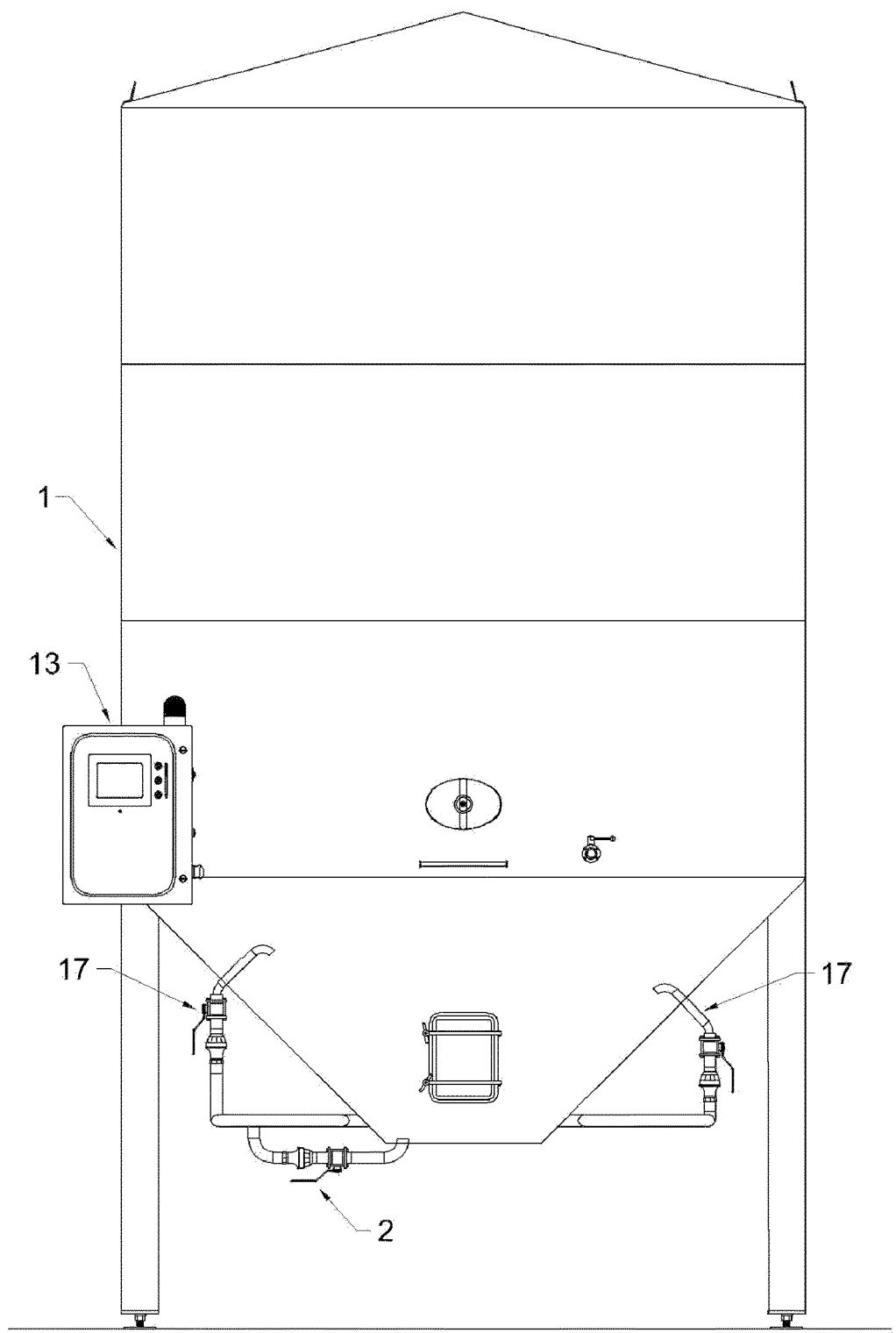
FIG. 2 shows an elevational view of equipment for devatting the grape harvest via the pressurised injection of air according to the invention, installed together with equipment for the pressurised injection of air for the process of pumping over the grape harvest during the maceration thereof.

FIG. 2 shows a means for devatting a grape harvest via the pressurised injection of air according to the invention, installed together with equipment for the pressurised injection of air for the process of pumping over the grape harvest during the maceration thereof. The means for devatting includes, together with the pumping-over diffusers (17), the at least one devatting diffuser (2) which is installed in the same compressed air distribution circuit (16) and controlled through the shared microprocessor (13) or an independent microprocessor (not depicted).

Figure 3:
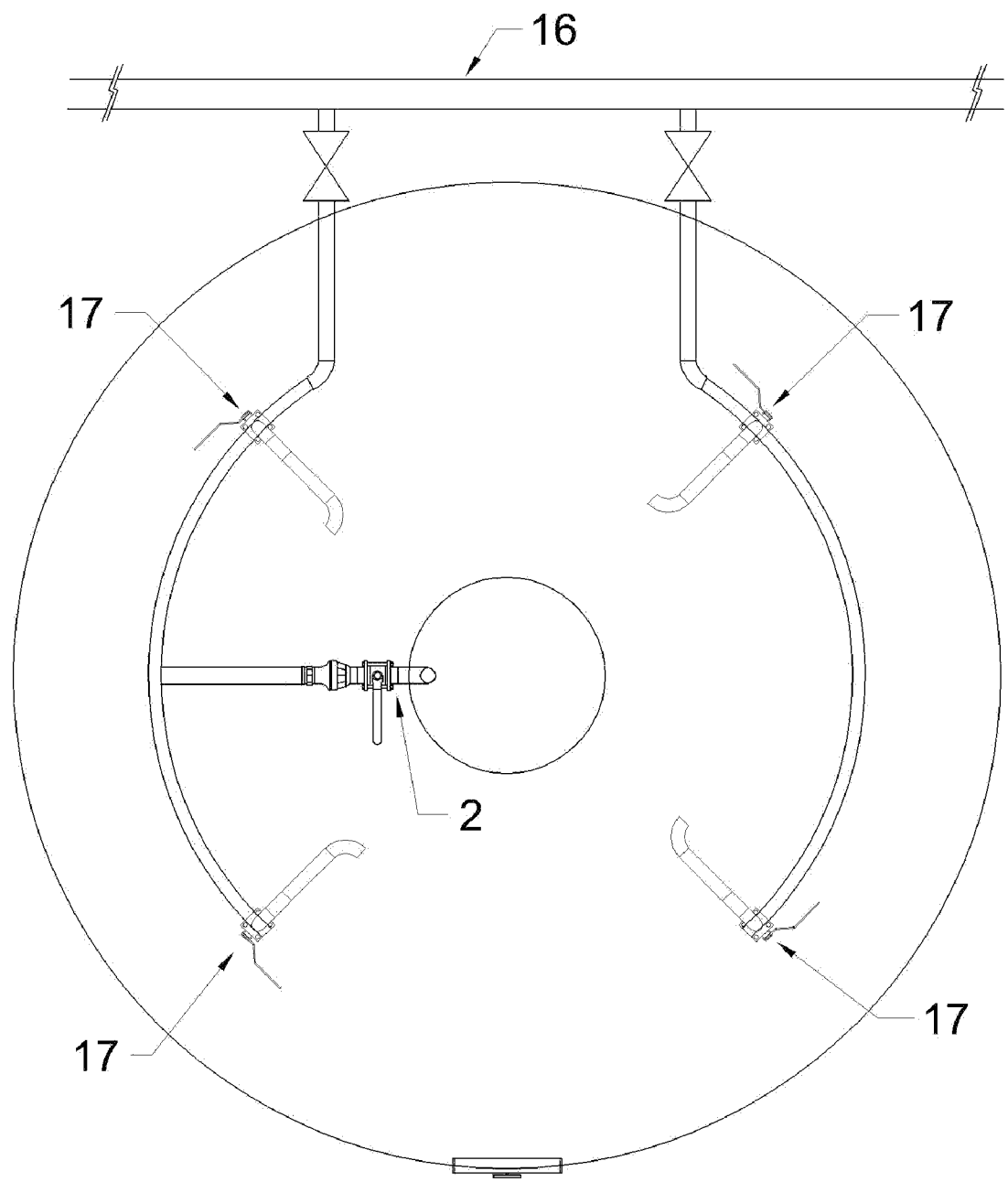
FIG. 3 shows a section view of the tank in which the plan view of the equipment for devatting the grape harvest via the pressurised injection of air according to the invention is seen, installed together with equipment for the pressurised injection of air for the process of pumping over the grape harvest during the maceration thereof.

FIG. 3 shows a plan view of the means for devatting a grape harvest via the pressurised injection of air according to the invention, installed together with equipment for the pressurised injection of air for the process of pumping over the grape harvest during the maceration thereof. As seen in said figure, the means for devatting includes, together with the pumping-over diffusers (17), the at least one devatting diffuser (2) which is installed in the same compressed air distribution circuit (16) and controlled through the shared microprocessor (13) or an independent microprocessor (not depicted).

Figure 4:
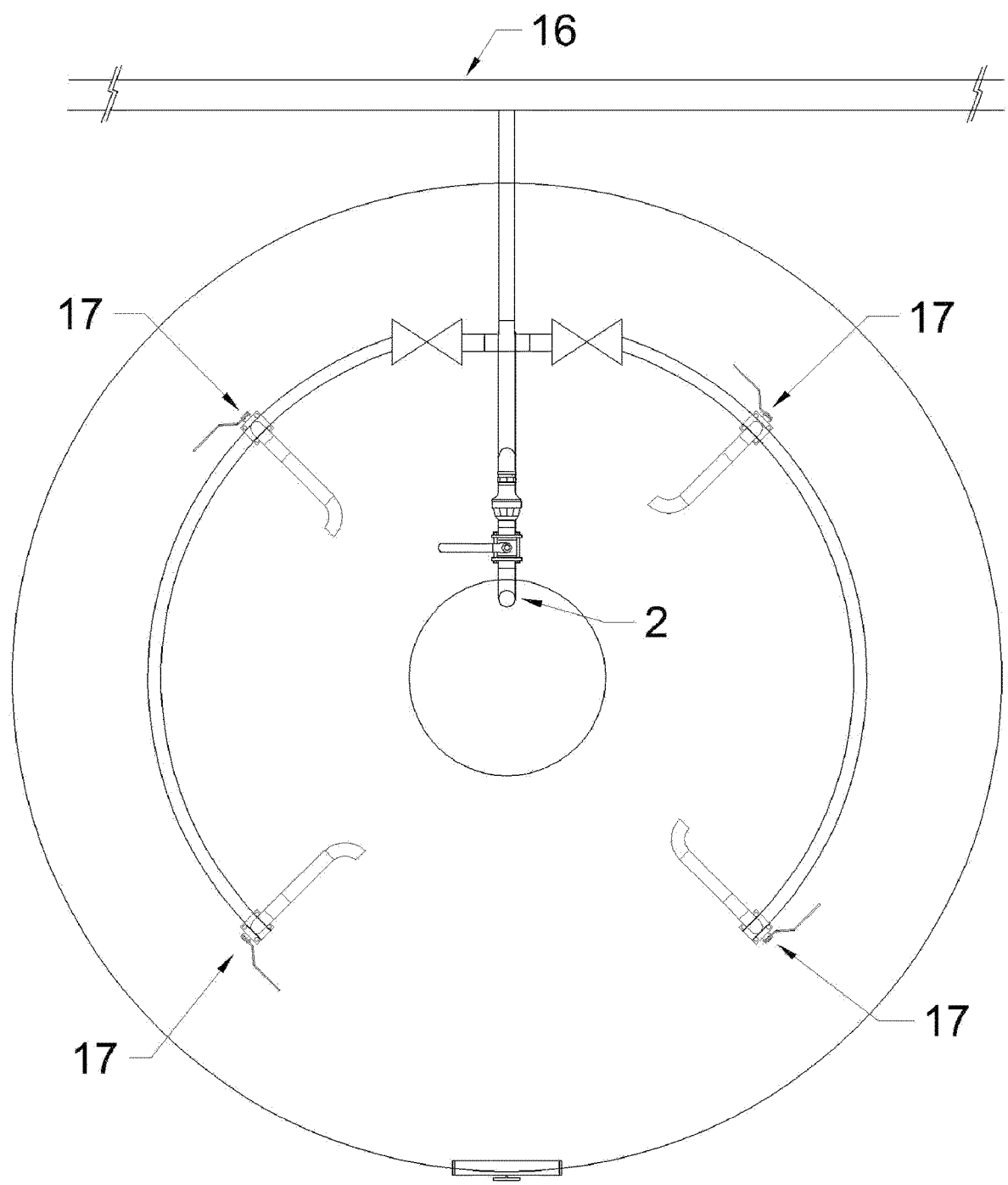
FIG. 4 shows a plan view of the means for devatting a grape harvest via the pressurised injection of air according to the invention, in an embodiment alternative to that of FIG. 3.

FIG. 4 shows a plan view of the means for devatting a grape harvest via the pressurised injection of air according to the invention, in an embodiment alternative to that of FIG. 3 in relation to the compressed air distribution circuit (16).

Advantageously, the at least one devatting diffuser (2) is installed at a height lower than the height of the pumping-over diffusers (17) with respect to the bottom of the wine making tank (1), for the purpose of performing a more efficient homogenisation.

Logically, the present invention is in no way limited to the described and depicted embodiments, but any variant or modification within the limit of the attached claims will be readily apparent to the skilled person. Particularly, the devatting system according to the invention can be installed in polygonal tanks having any number of sides.

The invention claimed is:

1. A wine making tank with means for devatting the grape harvest contained into the tank and formed by liquid-solid mixture with the differentiated liquid and solid phases comprising:
   at least one devatting diffuser for a pressurised injection of air or other gases in a controlled manner into the wine making tank located in a lower portion of a bottom of the tank,
   a compressed air distribution circuit that feeds the at least one devatting diffuser, said compressed air distribution circuit located outside the wine making tank, and
   a microprocessor configured to control the actuation time of the at least one devatting diffuser and to perform pressurized injection of air continuously for 10-20 minutes, homogenizing the liquid and solid phases before starting extraction of the grape harvest from the wine making tank through pumping,
   wherein the wine making tank has an opening for removing the grape harvest through a devatting pump and,
   the pressure of the pressurized air is comprised between 3 and 12 bar.

2. A method for devatting a grape harvest, using the wine making tank with means for devatting according to claim 1, the method comprising the following steps:
   performing pressurized injection of air continuously through the lower portion of the bottom of the tank for 10-20 minutes, homogenizing the liquid and solid phases before starting extraction of the grape harvest from the wine making tank through pumping;
   removing the grape harvest from the tank through one opening of the tank by extracting same through pumping, maintaining the pressurized injection of air;
   driving the grape harvest to a sieve, a conveyor with a bleeding grid, or a press with a bleeding grid, where the grape harvest is drained, sending a liquid portion to a storage area and a drained solid portion to a storage or pressing area, as appropriate;
   extracting the solid portion obtained in the press.

3. The method for devatting the grape harvest according to claim 2, wherein maintaining the injections of air for a duration between 1 and 15 seconds and at intervals comprised between 2 and 15 minutes until the end of devatting.

4. The method for devatting the grape harvest according to claim 2, wherein said method is controlled by a microprocessor, wherein the microprocessor is a PC type or a PLC type, in which time values are fixed or can be varied by a user of the pumping-over system.

5. The method for devatting the grape harvest according to claim 2, comprising an additional step of cleaning an inside of a means for injecting air.

6. The method for devatting the grape harvest according to claim 5, wherein the additional step of cleaning the inside of the means for injecting air consists of injecting water into the means for injecting air followed by injecting compressed air which dries said means.

7. The method for devatting the grape harvest according to claim 2, food grade purified air is used for carrying out the pressurized injection of air.

8. The method for devatting the grape harvest according to claim 2, comprising an additional step of purifying the compressed air to be injected into the tank.

9. The means for devatting the grape harvest according to claim 1, wherein the microprocessor is a PC type or a PLC type, in which values of the actuation times are fixed or varied by a user of a devatting system.

10. The means for devatting the grape harvest according to claim 1, further comprising a compressor including filters at an outlet of said compressor to eliminate moisture, oils and suspended particles from a compressed air before injecting into the wine making tank.

11. The means for devatting the grape harvest according to claim 1, wherein the compressed air distribution circuit includes a water intake for cleaning the at least one devatting diffuser once the devatting of the grape harvest processed in the wine making tank has been completed.

12. The means for devatting the grape harvest according to claim 1, further comprising at least one devatting diffuser installed together with pumping-over diffusers in the compressed air distribution circuit and controlled through the microprocessor or an independent microprocessor.

13. The means for devatting the grape harvest according to claim 1, wherein the at least one devatting diffuser is installed at a height lower than the height of the pumping-over diffusers with respect to the bottom of the wine making tank.

* * * * *